(12) United States Patent
Matsumoto

(10) Patent No.: US 10,377,186 B2
(45) Date of Patent: Aug. 13, 2019

(54) PNEUMATIC TIRE

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/534,463

(22) PCT Filed: Aug. 31, 2015

(86) PCT No.: PCT/JP2015/074648
§ 371 (c)(1),
(2) Date: Jun. 8, 2017

(87) PCT Pub. No.: WO2016/098394
PCT Pub. Date: Jun. 23, 2016

(65) Prior Publication Data
US 2017/0349006 A1 Dec. 7, 2017

(30) Foreign Application Priority Data

Dec. 15, 2014 (JP) .................................. 2014-252773

(51) Int. Cl.
*B60C 11/14* (2006.01)
*B60C 11/16* (2006.01)

(52) U.S. Cl.
CPC .......... *B60C 11/1675* (2013.01); *B60C 11/16* (2013.01); *B60C 11/1643* (2013.01); *B60C 11/1668* (2013.01)

(58) Field of Classification Search
CPC ........................... B60C 11/1675; B60C 11/16
(Continued)

(56) References Cited

U.S. PATENT DOCUMENTS

| 3,578,053 | A | * | 5/1971 | Milliken | ................. | B60C 11/16 |
| | | | | | | 152/210 |
| 6,374,886 | B1 | * | 4/2002 | Eromaki | ................. | B60C 11/16 |
| | | | | | | 152/210 |
| 2007/0056666 | A1 | * | 3/2007 | Eromaki | ................. | B60C 11/12 |
| | | | | | | 152/210 |

FOREIGN PATENT DOCUMENTS

| DE | 2342743 A1 * | 3/1975 | ............. | B60C 11/16 |
| EP | 2977231 A1 * | 1/2016 | ......... | B60C 11/1643 |

(Continued)

OTHER PUBLICATIONS

Machine Translation: DE-2342743-A1; Kreps Walter; no date.*
(Continued)

*Primary Examiner* — Steven D Maki
*Assistant Examiner* — Kendra Ly
(74) *Attorney, Agent, or Firm* — Thorpe North & Western

(57) ABSTRACT

A stud pin includes a buried base portion embedded in a tread portion of a pneumatic tire and a tip portion protruding from the road contact surface of the tread portion when the buried base portion is embedded in the tread portion. A tip surface of the tip portion includes: a first protrusion portion and a second protrusion portion longer in the tire width direction than in the tire circumferential direction and protruding toward one side in the tire circumferential direction; a first recessed portion disposed between the first and second protrusion portions and recessed toward the other side in the tire circumferential direction; a third protrusion portion and a fourth protrusion portion protruding toward the other side in the tire circumferential direction; and a second recessed portion disposed between the third and fourth protrusion portions and recessed toward the one side in the tire circumferential direction.

11 Claims, 8 Drawing Sheets

(58) Field of Classification Search
USPC .......................................... D12/608; 152/210
See application file for complete search history.

(56) References Cited

FOREIGN PATENT DOCUMENTS

| JP | 01132407 A | * | 5/1989 | ......... B60C 11/1675 |
| JP | 2012-180012 | | 9/2012 | |
| JP | 2014012455 A | * | 1/2014 | ......... B60C 11/1656 |
| JP | 2015058787 A | * | 3/2015 | ......... B60C 11/1675 |
| WO | WO 2012/117962 | | 9/2012 | |
| WO | WO 2014/122570 | | 8/2014 | |
| WO | WO-2014148262 A1 | * | 9/2014 | ......... B60C 11/1643 |

OTHER PUBLICATIONS

Machine Translation: JP-01132407-A; Shikama, Hajime; (Year: 2018).*
Machine Translation: JP-2014012455-A; Sawada Hiroki; (Year: 2018).*
Machine Translation: JP-2015058787-A; Yasunaga Tomokazu (Year: 2018).*
International Search Report for International Application No. PCT/JP2015/074648 dated Oct. 6, 2015, 2 pages, Japan.

* cited by examiner

PNEUMATIC TIRE

TECHNICAL FIELD

The present technology relates to pneumatic tires with stud pins fitted into tread portions.

BACKGROUND ART

Conventional snow tires provide grip on icy road surfaces via stud pins fitted into the tread portion of the tire.

Typical stud pins are embedded into stud pin installation holes provided in the tread portion. When the stud pins are embedded in the stud pin installation holes, the stud pin installation holes expand in diameter. By inserting the stud pins into the stud pin installation holes in this state, the stud pins are firmly embedded in the stud pin installation holes and are thus prevented from dropping from the stud pin installation holes upon receiving breaking and driving force or lateral force from the road surface during tire rolling motion.

The stud pins each include a buried base portion and a tip portion protruding from one end surface of the buried base portion. The buried base portion is fitted into the stud pin installation hole formed in a tread surface of the tire such that the tip portion protrudes from the tread surface.

When an edge of the tip portion comes into contact with an icy road surface and then exhibits edge effect, the stud pin provides great gripping force. Thus, the edge effect has been attempted to be enhanced by increasing the edge of the tip portion that comes into contact with an icy road surface.

A stud pin is known that includes a tip portion having a tip surface shaped into a concave polygon and a side surface provided with a recessed portion to increase the edge of the tip portion (For example, see International Patent Application Publication No. WO 2014/122570).

Unfortunately, if a tire fitted with such stud pins having tip surfaces shaped into a concave polygon runs on an icy road surface, small ice chipped by the tip portions in braking may accumulate in the recessed portions of the tip portions. Such small ice accumulating in the recessed portions may decrease the edge effect of the tip portions, resulting in a decrease in braking performance. Thus, small ice accumulating in the recessed portions is required to be discharged to maintain the edge effect.

SUMMARY

The present technology provides a pneumatic tire including stud pins that can maintain the edge effect of tip portions.

According to an aspect of the present technology, a pneumatic tire includes stud pins fitted into stud pin installation holes of a tread portion of the pneumatic tire. The stud pins each include: a buried base portion being embedded in the tread portion of the pneumatic tire and extending in a tire radial direction; and a tip portion protruding from a road contact surface of the tread portion upon embedding of the buried base portion into the tread portion. The tip portion has a tip surface longer in a tire width direction than in a tire circumferential direction. The tip surface has a contour formed by: a first protrusion portion and a second protrusion portion protruding toward a first side in the tire circumferential direction; a first recessed portion disposed between the first protrusion portion and the second protrusion portion and recessed toward a second side opposite the first side in the tire circumferential direction; a third protrusion portion and a fourth protrusion portion protruding toward the second side in the tire circumferential direction; and a second recessed portion disposed between the third protrusion portion and the fourth protrusion portion and recessed toward the first side in the tire circumferential direction. The first recessed portion and the second recessed portion are each formed by a pair of adjacent sides of the tip surface. One of the pair of adjacent sides inclines relative to the tire width direction at an angle greater than 0 degrees and less than 90 degrees, and another one of the pair of adjacent sides inclines in an opposite direction to the inclining direction of the one of the pair of adjacent sides relative to the tire width direction at an angle greater than 0 degrees and less than 90 degrees.

Preferably, the first recessed portion and the second recessed portion are in the same position in the tire width direction.

Preferably, the tip surface includes six to ten protrusion portions protruding outward, inclusive the first to fourth protrusion portions.

Preferably, a ratio Lmin/Lmax of a distance Lmin from the first recessed portion to the second recessed portion to a maximum length Lmax of the tip surface in the tire circumferential direction is 0.3 or greater and 0.7 or less.

Preferably, the protrusion portions each include a corner having an angle of 30° or greater and 150° or less.

Preferably, the buried base portion includes: a third recessed portion recessed from a side surface of the buried base portion on the first side in the tire circumferential direction toward the second side; and a fourth recessed portion recessed from a side surface on the second side in the tire circumferential direction toward the first side.

Preferably, for example, the buried base portion includes: a body portion to which the tip portion is anchored; a bottom portion located on an end portion opposite the body portion; and a shank portion connecting the body portion to the bottom portion. The bottom portion includes: a third recessed portion recessed from a side surface of the bottom portion on the first side in the tire circumferential direction toward the second side; and a fourth recessed portion recessed from a side surface on the second side in the tire circumferential direction toward the first side.

Alternatively, the buried base portion preferably includes: a body portion to which the tip portion is anchored; a bottom portion located on an end portion opposite the body portion; and a shank portion connecting the body portion to the bottom portion. The body portion includes: a fifth recessed portion recessed from a side surface of the body portion on the first side in the tire circumferential direction toward the second side; and a sixth recessed portion recessed from a side surface on the second side in the tire circumferential direction toward the first side.

The bottom portion may include the third recessed portion and the fourth recessed portion, and the body portion may include the fifth recessed portion and the sixth recessed portion.

Preferably, the buried base portion includes: a body portion to which the tip portion is anchored; a bottom portion located on an end portion opposite the body portion; and a shank portion connecting the body portion to the bottom portion. The bottom portion has a cross section perpendicular to an extending direction of the buried base portion, the cross section having a substantially rectangular shape including a longitudinal direction in the tire circumferential direction.

Preferably, the buried base portion includes: a body portion to which the tip portion is anchored; a bottom portion located on an end portion opposite the body portion;

and a shank portion connecting the body portion to the bottom portion. The bottom portion has a cross section perpendicular to an extending direction of the buried base portion, the cross section having a substantially rectangular shape including a longitudinal direction in the tire width direction.

According to the above aspect, even if chipped small ice accumulates in the first recessed portion between the first protrusion portion and the second protrusion portion protruding toward the one side in the tire circumferential direction, small ice accumulating in the second recessed portion between the third protrusion portion and the fourth protrusion portion protruding toward the other side in the tire circumferential direction can be discharged. The edge effect of the tip portions can thus be maintained.

BRIEF DESCRIPTION OF DRAWINGS

FIG. 4 is a plan view illustrating the shape of a tip surface 60a.

DETAILED DESCRIPTION

Embodiments of the present technology will be described below in detail with reference to the drawings.

First Embodiment

Overall Description of Tire

Figure 1:
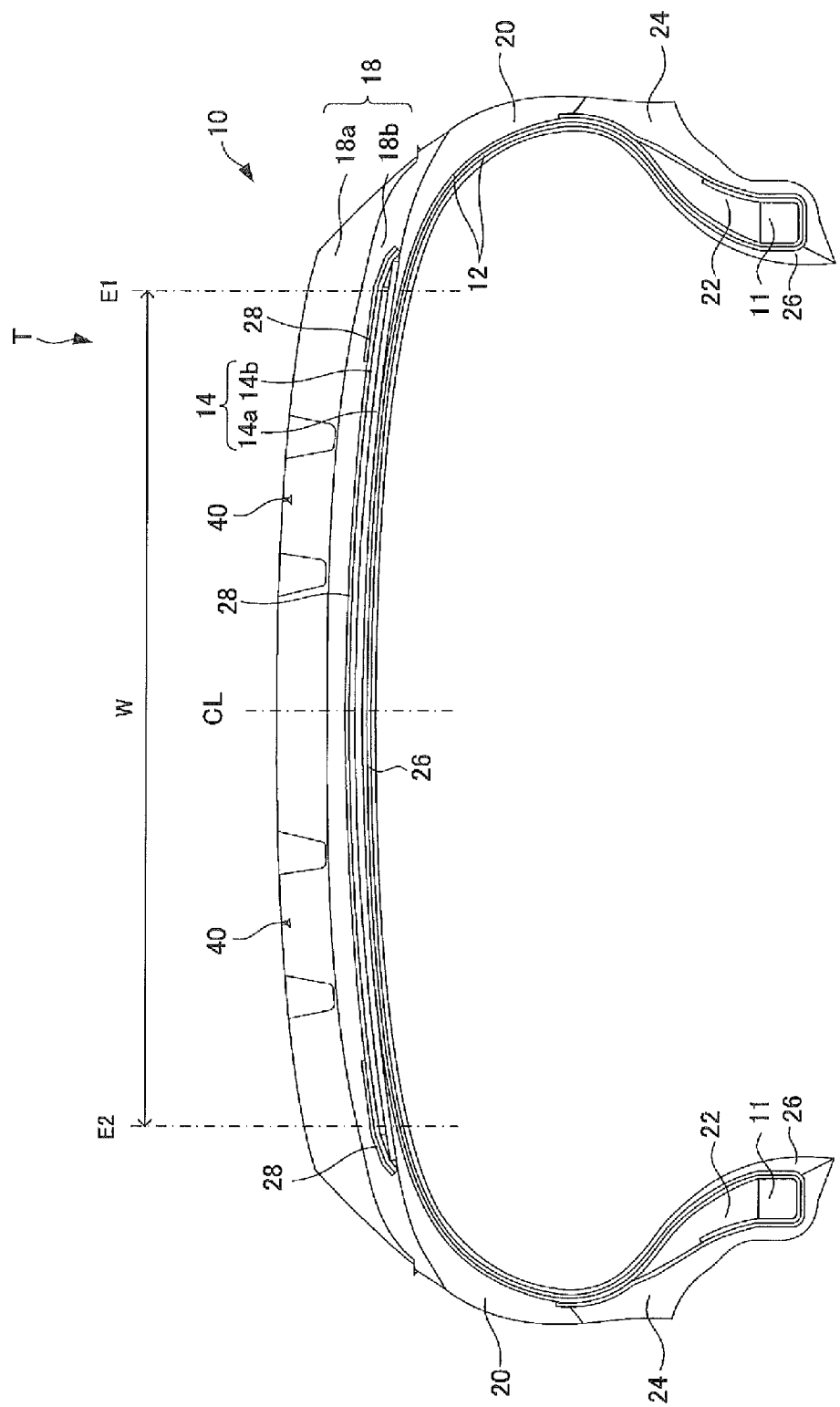
FIG. 1 is a tire cross-sectional view illustrating a cross section of a pneumatic tire of the embodiment.

Below, a pneumatic tire of the present embodiment is described. FIG. 1 is a tire cross-sectional view illustrating a cross section of a pneumatic tire (hereinafter referred to as "tire") 10 of the present embodiment.

The tire 10 is, for example, used for a passenger vehicle. A tire for a passenger vehicle refers to a tire defined according to Chapter A of the JATMA Yearbook 2012 (standards of The Japan Automobile Tyre Manufacturers Association, Inc.). The tire 10 can also be a small truck tire as defined in Chapter B and a truck tire or bus tire as defined in Chapter C.

Below, values of the dimensions of various pattern elements are described in detail as example values for a tire for a passenger vehicle. However, the pneumatic tire of the present technology is not limited to these example values.

The "tire circumferential direction" described below refers to the direction (both rotation directions) in which the tread surface rotates when the tire 10 rotates about the tire rotation axis. The "tire radial direction" refers to the direction that extends radially orthogonal to the tire rotation axis. "Outward in the tire radial direction" refers to the side away from the tire rotation axis in the tire radial direction. The "tire width direction" refers to the direction parallel to the tire rotation axis direction. "Outward in the tire width direction" refers to the both sides away from the center line CL of the tire 10.

Tire Structure

The tire 10 mainly includes a pair of bead cores 11, a carcass ply layer 12, and a belt layer 14 as framework components, and around these framework components, a tread rubber member 18, side rubber members 20, bead filler rubber members 22, rim cushion rubber members 24, and an innerliner rubber member 26 are included.

The pair of bead cores 11 are annular members disposed at the both end portions in the tire width direction, inward in the tire radial direction.

The carcass ply layer 12 includes one or more carcass ply members 12a, 12b, which are made of organic fibers covered with rubber. The carcass ply members 12a, 12b extend between and around the pair of bead cores 11 to form a toroidal form.

The belt layer 14 includes a plurality of belt members 14a, 14b. The belt layer 14 is wound in the tire circumferential direction outward of the carcass ply layer 12 in the tire radial direction. The inward belt member 14a in the tire radial direction has a width in the tire width direction greater than the width of the outward belt member 14b in the tire radial direction.

The belt members 14a, 14b are members made of steel cords covered with rubber. The steel cords of the belt members 14a, 14b are disposed so as to be inclined at a predetermined angle of, for example, from 20 degrees to 30 degrees, with respect to the tire circumferential direction. The steel cords of the belt members 14a, 14b are inclined in the directions opposite to one another with respect to the tire circumferential direction and cross one another. The belt layer 14 minimizes or prevents expansion of the carcass ply layer 12 caused by the pressure of the air in the tire 10.

The tread rubber member 18 is disposed outward of the belt layer 14 in the tire radial direction. The side rubber members 20 are connected to both end portions of the tread rubber member 18. The tread rubber member 18 is made of two layers: an upper layer tread rubber member 18a disposed outward in the tire radial direction and a lower layer tread rubber member 18b disposed inward in the tire radial direction. The upper layer tread rubber member 18a is provided with a circumferential groove, a lug groove, and stud pin installation holes 40.

The rim cushion rubber members 24 are provided at the inward ends of the sidewall rubber members 20 in the tire radial direction. The rim cushion rubber members 24 come into contact with the rim on which the tire 10 is mounted. The bead filler rubber members 22 are disposed at an outward of the bead core 11 in the tire radial direction so as to be interposed between the carcass ply layer 12 wound around the bead core 11. The innerliner rubber member 26 is disposed on an inner surface of the tire 10 facing a tire cavity region that is filled with air and is surrounded by the tire 10 and the rim.

In addition, the tire 10 is provided with a belt cover layer 28 that covers the outward surface of the belt layer 14 in the tire radial direction. The belt cover layer 28 is made of organic fibers covered with rubber.

The tire 10 has the tire structure illustrated in FIG. 1. However, the pneumatic tire of the present technology is not limited to this structure.

Stud Pin

Figure 2:
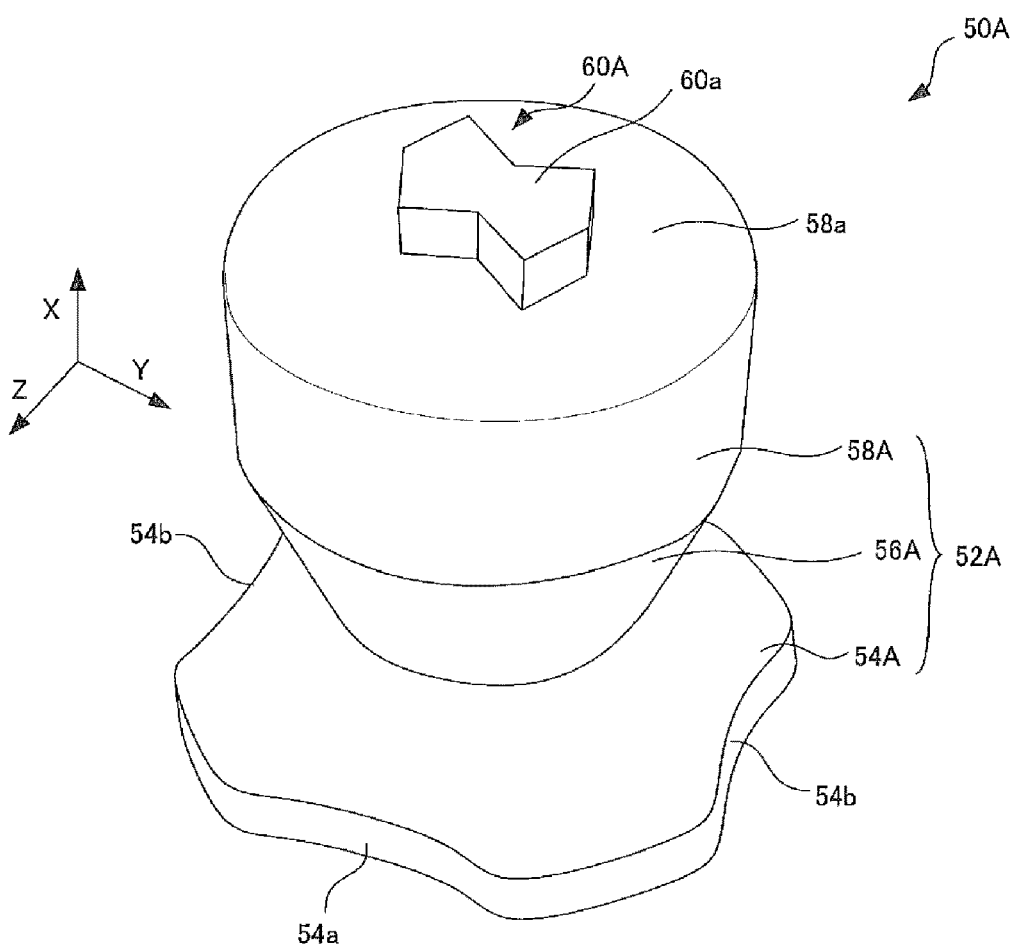
FIG. 2 is an external perspective view illustrating a stud pin 50A of a first embodiment of the present technology.
Figure 3:
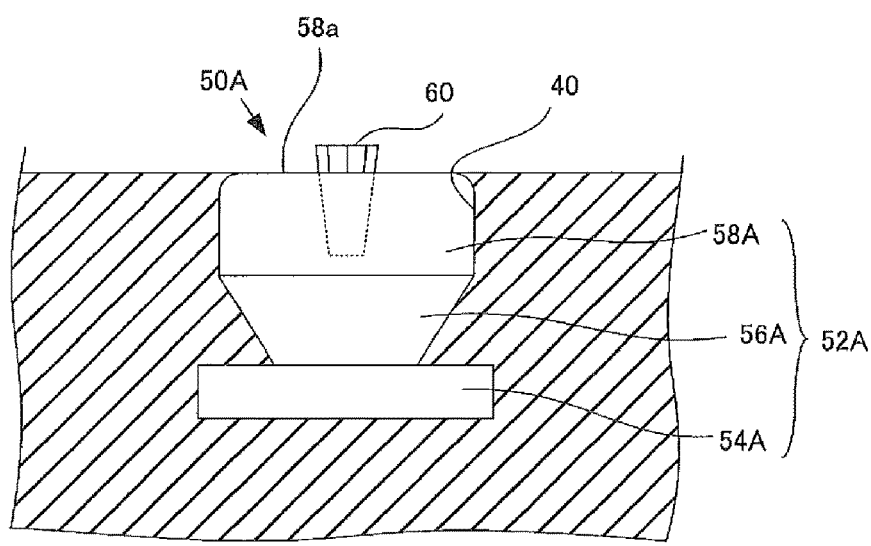
FIG. 3 is a side view illustrating the stud pin 50A fitted into a tread portion.

FIG. 2 is an external perspective view illustrating a stud pin 50A of the first embodiment of the present technology. FIG. 3 is a side view illustrating the stud pin 50A fitted into the stud pin installation hole 40 provided on the tread rubber member 18 of a tread portion T.

The stud pin 50A mainly includes a buried base portion 52A and a tip portion 60A. The buried base portion 52A is embedded in the stud pin installation hole 40 of the pneumatic tire to be mounted. The stud pin 50A is secured in the tread portion by the buried base portion 52A being pressed by the tread rubber material 18 via the side surface of the stud pin installation hole 40. The stud pin 50A includes the buried base portion 52A and the tip portion 60A that are formed in this order in the X direction. Note that the X direction corresponds to the extending direction of the buried base portion 52A toward the tip portion 60, and the normal line direction relative to the tread surface of the tread portion when the stud pin 50A is fitted into the stud pin installation hole 40. The Y direction corresponds to the direction toward one side in the tire width direction, and the Z direction corresponds to one of the rotating directions in the tire circumferential direction.

The buried base portion 52A includes a bottom portion 54A, a shank portion 56A, and a body portion 58A that are formed in this order in the X direction.

The bottom portion 54A is located on an end portion opposite the tip portion 60A. The bottom portion 54A has a flange shape and prevents rotation of the stud pin 50A in the stud pin installation hole 40 when the stud pin 50A receives force from the road surface.

The bottom portion 54A is provided, on the outer peripheral surface coming into contact with the side surface of the stud pin installation hole 40, with recessed portions 54a on both sides in the tire circumferential direction and recessed portions 54b on both sides in the tire width direction. Specifically, the cross section of the bottom portion 54B is a substantially quadrangular shape with rounded corners. The four sides of the substantially quadrangular shape are recessed to form four of the recessed portions 54a, 54b. The substantially quadrangular bottom portion 54A prevents or minimizes rotational motion of the stud pin 50A about a central axis thereof aligned with the X direction. Note that the rounded corners of the bottom portion 54A can prevent damage to the side surface of the stud pin installation hole 40. Forming the recessed portions 54a, 54b can increase the surface area per unit volume of the bottom portion 54A and can thus increase the surface contact area with the tread rubber member 18 of the tread portion and the friction force restricting movement of the stud pin 50A. The tread rubber member 18 filling the recessed portions 54a, 54b also prevents or minimizes rotational motion of the stud pin 50A about the central axis thereof aligned with the X direction. In addition, the recessed portions 54a, 54b ensure that a first recessed portion 81 and a second recessed portion 82 of the tip portion 60A, which will be described later, face the tire circumferential direction.

The shank portion 56A connects the body portion 58A to the bottom portion 54A. The shank portion 56A has a truncated cone shape with a diameter less than the maximum outer diameter of the bottom portion 54A and that of the body portion 58A. The shank portion 56A is thus formed as a recessed portion relative to the body portion 58A and the bottom portion 54A, and the bottom portion 54A and the body portion 58A are formed like flanges.

The body portion 58A is cylindrical, is located between the shank portion 56A and the tip portion 60A, and is formed like a flange connected to the tip portion 60A. The body portion 58A is embedded in the tread rubber member 18, with an upper end surface of the body portion 58A being exposed, flush with the tread surface when the stud pin 50A is fitted into the tire 10.

The tip portion 60A protrudes from the tread surface when the stud pin 50A is fitted in the tread portion, as illustrated in FIG. 3, and comes into contact with the road surface or claws the ice. The tip portion 60A protrudes from an upper end surface of the buried base portion 52A in a concave polygonal column shape. In the present embodiment, at the tip of the tip portion 60A (an end portion in the X direction), a tip surface 60a (an outward end surface in the tire radial direction) perpendicular to the extending direction of the buried base portion 52A (the X direction in FIG. 2) is formed.

The tip portion 60A may be made from the same metal material as that of the buried base portion 52A or of different metal material. For example, the buried base portion 52A and the tip portion 60A may be made from aluminum. Alternatively, the buried base portion 52A may be made from aluminum and the tip portion 60A may be made from tungsten. If the buried base portion 52A and the tip portion 60A are made from different metal materials, the tip portion 60A can be anchored to the buried base portion 52A by, for example, hammering the tip portion 60A to mate the tip portion 60A with a hole (not illustrated) formed in the upper end surface of the body portion 58A of the buried base portion 52A.

Figure 4:
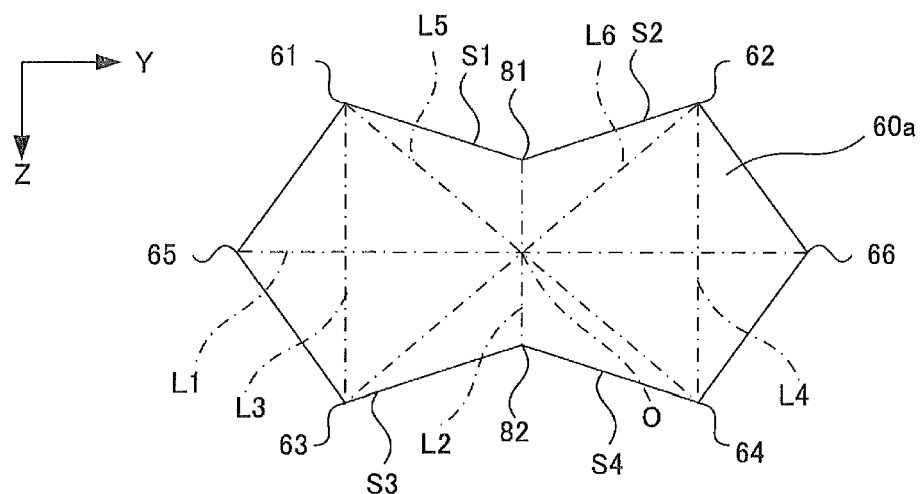

FIG. 4 is a plan view illustrating the shape of the tip surface 60a. As illustrated in FIG. 4, the tip surface 60a has a polygonal shape longer in the tire width direction than in the tire circumferential direction. The stud pin 50A is fitted into the stud pin installation hole 40 of the tire 10 with the lateral direction in FIG. 4 being the tire width direction and the vertical direction in FIG. 4 being the tire circumferential direction.

The tip surface 60a includes at least a first protrusion portion 61, a second protrusion portion 62, a third protrusion portion 63, a fourth protrusion portion 64, the first recessed portion 81, and the second recessed portion 82.

The first protrusion portion 61 and the second protrusion portion 62 are provided so as to protrude toward one side in the tire circumferential direction (the upper side in FIG. 4).

The first protrusion portion 61 is a corner formed such that two adjacent sides on the one side in the tire circumferential direction among the sides of the tip surface 60a form an interior angle less than 180 degrees. At least one side S1 of the two sides inclines relative to the tire width direction, and the other side inclines in an opposite direction to the inclining direction of the side S1 relative to the tire width direction or is parallel to the tire width direction.

The second protrusion portion 62 is a corner formed by two adjacent sides on the one side in the tire circumferential direction among the sides of the tip surface 60a. At least one side S2 of the two sides inclines relative to the tire width direction, and the other side inclines in an opposite direction to the inclining direction of the side S2 relative to the tire width direction or is parallel to the tire width direction.

The first recessed portion 81 is disposed between the first protrusion portion 61 and the second protrusion portion 62. The first recessed portion 81 is recessed toward the other side in the tire circumferential direction (the lower side in FIG. 4). The first recessed portion 81 is a corner formed by the pair of the adjacent sides S1, S2 of the tip surface 60a. One side S1 of the paired sides inclines relative to the tire width direction at an angle greater than 0 degrees and less than 90 degrees. The other side S2 inclines in an opposite direction to the inclining direction of the one side S1 relative to the tire width direction at an angle greater than 0 degrees and less than 90 degrees.

The third protrusion portion 63 and the fourth protrusion portion 64 are provided so as to protrude toward the other side in the tire circumferential direction (the lower side in FIG. 4). Each of the third protrusion portion 63 and the fourth protrusion portion 64 is formed by two adjacent sides on the other side in the tire circumferential direction among the sides of the tip surface 60a. The paired two sides incline in mutually opposite directions relative to the tire circumferential direction and intersect with each other so as to form an interior angle less than 180 degrees.

The third protrusion portion 63 is a corner formed such that the two adjacent sides on the one side in the tire circumferential direction among the sides of the tip surface 60a form an interior angle less than 180 degrees. At least one side S3 of the two sides inclines relative to the tire width direction, and the other side inclines in an opposite direction to the inclining direction of the side S3 relative to the tire width direction or is parallel to the tire width direction.

The fourth protrusion portion 64 is a corner formed by the two adjacent sides on the one side in the tire circumferential direction among the sides of the tip surface 60a. At least one side S4 of the two sides inclines relative to the tire width direction, and the other side inclines in an opposite direction to the inclining direction of the side S4 relative to the tire width direction or is parallel to the tire width direction.

The second recessed portion 82 is disposed between the third protrusion portion 63 and the fourth protrusion portion 64. The second recessed portion 82 is recessed toward the one side in the tire circumferential direction (the upper side in FIG. 4). The second recessed portion 82 is a corner formed by the pair of the adjacent sides S3, S4 of the tip surface 60a. One side S3 of the paired sides inclines relative to the tire width direction at an angle greater than 0 degrees and less than 90 degrees. The other side S4 inclines in an opposite direction to the inclining direction of the one side S3 relative to the tire width direction at an angle greater than 0 degrees and less than 90 degrees.

The sides of the polygonal tip surface 60a are preferably straight line segments. However, the sides may be bent and round. For example, the sides may be bent with a radius of curvature greater than the length of the tip surface 60a in the tire width direction.

The corners of the tip surface 60a are each formed by connecting the endpoints of the two adjacent sides such that the two adjacent sides form an angle other than 180 degrees. However, the corners may be round and, for example, may be bent with a radius of curvature equal to or less than 1/10 of the shortest side of the tip surface 60a.

In addition to the first to fourth protrusion portions 61 to 64, the tip surface 60a may further include one or more protrusion portions. The number of the protrusion portions of the tip surface 60a is preferably six to ten, inclusive of the first to fourth protrusion portions 61 to 64. Less than six protrusion portions provide insufficient edge effect. On the other hand, more than ten protrusion portions disperse edge components, resulting in insufficient mechanical breaking effect on the icy road surface.

In the present embodiment, the tip surface 60a further includes a fifth protrusion portion 65 and a sixth protrusion portion 66 disposed at both end portions in the tire width direction.

The fifth protrusion portion 65 is provided so as to protrude toward one side in the tire width direction (the left side in FIG. 4).

The sixth protrusion portion 66 is provided so as to protrude toward the other side in the tire width direction (the right side in FIG. 4).

The interior angle of the tip surface 60a at each of the first protrusion portion 61, the second protrusion portion 62, the third protrusion portion 63, the fourth protrusion portion 64, the fifth protrusion portion 65, and the sixth protrusion portion 66 is less than 180°, preferably 30° or greater and 150° or less, and more preferably 60° or greater and 130° or less. An interior angle less than 30° is not preferable because edge effect becomes excessively great and thus, chipped small ice readily accumulates in the first recessed portion 81 and the second recessed portion 82. On the other hand, an interior angle greater than 150° is not preferable because sufficient edge effect cannot be yielded.

The interior angle of the tip surface 60b at each of the first recessed portion 81 and the second recessed portion 82 is greater than 180°. The interior angle of the tip surface 60b at each of the first recessed portion 81 and the second recessed portion 82 is preferably 300° or less, and more preferably 260° or less. An interior angle greater than 300° is not preferable because small ice readily accumulates in the first recessed portion 81.

In the embodiment illustrated in FIG. 4, the interior angle of the tip surface 60b at each of the first recessed portion 81 and the second recessed portion 82 is approximately twice (1.8 to 2.2 times) the interior angle of the tip surface 60a at each of the first protrusion portion 61, the second protrusion portion 62, the third protrusion portion 63, the fourth protrusion portion 64, the fifth protrusion portion 65, and the sixth protrusion portion 66.

Specifically, the interior angle of the tip surface 60a at each of the first protrusion portion 61, the second protrusion portion 62, the third protrusion portion 63, the fourth protrusion portion 64, the fifth protrusion portion 65, and the sixth protrusion portion 66 is approximately 108°. The interior angle of the tip surface 60b at each of the first recessed portion 81 and the second recessed portion 82 is approximately 216°.

In the present embodiment, the tip surface 60a preferably has line symmetry with respect to a line segment L1 connecting the apex of the fifth protrusion portion 65 with the apex of the sixth protrusion portion 66. The tip surface 60a having line symmetry with respect to the line segment L1 allows the apex of the first protrusion portion 61 and the apex of the third protrusion portion 63 to be in the same position in the tire width direction, the apex of the second protrusion portion 62 and the apex of the fourth protrusion portion 64 to be in the same position in the tire width direction, and the apex of the first recessed portion 81 and the apex of the second recessed portion 82 to be in the same position in the tire width direction, upon fitting the stud pin 50A into the stud pin installation hole 40 with the line segment L1 being aligned with the tire width direction. At this time, a line segment L2 connecting the apex of the first recessed portion 81 with the apex of the second recessed portion 82, a line segment L3 connecting the apex of the first protrusion portion 61 with the apex of the third protrusion portion 63, and a line segment L4 connecting the apex of the second protrusion portion 62 with the apex of the fourth protrusion portion 64 are orthogonal to the line segment L1.

In the present embodiment, the tip surface 60a has line symmetry with respect to the line segment L2. The right and left halves with respect to the line segment L2 are pentagonal. Accordingly, upon fitting the stud pin 50A into the stud pin installation hole 40 with the line segment L2 being aligned with the tire width direction, the apex of the first protrusion portion 61 and the apex of the second protrusion portion 62 are in the same position in the tire circumferential direction, the apex of the third protrusion portion 63 and the apex of the fourth protrusion portion 64 are in the same position in the tire circumferential direction, and the apex of the fifth protrusion portion 65 and the apex of the sixth protrusion portion 66 are in the same position in the tire circumferential direction. The side S1 and the side S2 are symmetric to each other with respect to the line segment L2, and the side S3 and the side S4 are symmetric to each other with respect to the line segment L2.

Furthermore, the tip surface 60a has point symmetry with respect to the point of intersection O of the line segment L1 and the line segment L2. Accordingly, the distance from the line segment L2 to the line segment L3 equals the distance from the line segment L2 to the line segment L4. Here, a line segment L5 connecting the apex of the first protrusion portion 61 with the apex of the fourth protrusion portion 64 and a line segment L6 connecting the apex of the second protrusion portion 62 with the apex of the third protrusion portion 63 pass through the point of intersection O.

The tip surface 60a having such a symmetric shape enables edge effect to be sufficiently exhibited in any direction, resulting in enhancement in braking performance and turning performance on snow.

In the present embodiment, even if chipped small ice accumulates in the first recessed portion 81 between the first protrusion portion 61 and the second protrusion portion 62 protruding toward the one side in the tire circumferential direction in braking, small ice accumulating in the second recessed portion 82 between the third protrusion portion 63 and the fourth protrusion portion 64 protruding toward the other side in the tire circumferential direction can be discharged. For example, if the line segment L1 is parallel to the road surface and the line segments L2, L3, L4 incline relative to the road surface, the tip surface 60a comes into contact with the road surface only at the first protrusion portion 61 and the second protrusion portion 62, or the tip surface 60a comes into contact with the road surface only at the third protrusion portion 63 and the fourth protrusion portion 64.

With the tip surface 60a coming into contact with the road surface only at the first protrusion portion 61 and the second protrusion portion 62, the first recessed portion 81 is away from the road surface. Small ice accumulating in the first recessed portion 81 in braking is thus discharged from the triangular region formed by the apexes of the first protrusion portion 61, the second protrusion portion 62, and the first recessed portion 81 through a gap between the tip surface 60a and the road surface to the other side in the tire circumferential direction (the lower side in FIG. 4).

On the other hand, with the tip surface 60a coming into contact with the road surface only at the third protrusion portion 63 and the fourth protrusion portion 64, the second recessed portion 82 is away from the road surface. Small ice accumulating in the first recessed portion 81 in braking is thus discharged from the gap between the tip surface 60a and the road surface through the triangular region formed by the apexes of the third protrusion portion 63, the fourth protrusion portion 64, and the second recessed portion 82 to the other side in the tire circumferential direction (the lower side in FIG. 4).

According to the present embodiment, small ice can be discharged from the first recessed portion 81 side to the second recessed portion 82 side in this way, so that the edge effect of the tip portion 60A can be maintained. To exhibit the above function, it is preferable that the first recessed portion 81 is positioned between the third protrusion portion 63 and the fourth protrusion portion 64 in the tire width direction and that the second recessed portion 82 is positioned between the first protrusion portion 61 and the second protrusion portion 62 in the tire width direction.

Furthermore, the first recessed portion 81 and the second recessed portion 82 that are in the same position in the tire width direction allow the distance from the first recessed portion 81 to the second recessed portion 82 to be shortest, so that small ice accumulating in the first recessed portion 81 can be more readily discharged to the second recessed portion 82.

Here, the maximum length Lmax of the tip surface 60a in the tire circumferential direction in the present embodiment equals the length of the line segment L3 and the line segment L4. The distance Lmin from the first recessed portion 81 to the second recessed portion 82 equals the length of the line segment L2. The ratio Lmin/Lmax of Lmin to Lmax is preferably 0.3 or greater and 0.7 or less. A ratio Lmin/Lmax of greater than 0.7 is not preferable because sufficient edge effect cannot be yielded at the first recessed portion 81 and the second recessed portion 82. On the other hand, a ratio Lmin/Lmax of less than 0.3 is not preferable because small ice readily accumulates in the first recessed portion 81.

The above embodiment is described about the tip portion 60A having the tip surface 60a including six protrusion portions 61 to 66; however, the present technology is not limited to this configuration, and the tip surface may include six to ten protrusion portions. Modified examples of the present embodiment will now be described in the followings.

First Modified Example

Figure 5:
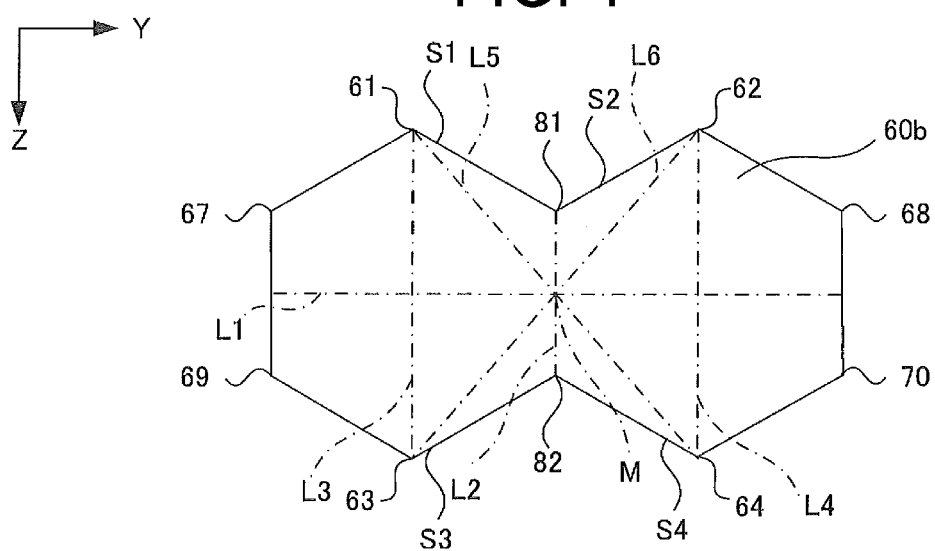
FIG. 5 is a plan view illustrating the shape of a tip surface 60b.

FIG. 5 is a plan view illustrating a tip surface 60b according to a first modified example of the present technology. In the first modified example, the tip surface 60b includes eight protrusion portions 61 to 64, 67 to 70 and two recessed portions 81, 82.

In the first modified example, the tip surface 60b also has a shape longer in the tire width direction than in the tire circumferential direction. The stud pin is fitted into the stud pin installation hole 40 of the tire 10 with the lateral direction in FIG. 5 being the tire width direction and the vertical direction in FIG. 5 being the tire circumferential direction.

A first protrusion portion 61 and a second protrusion portion 62 are provided so as to protrude toward one side in the tire circumferential direction (the upper side in FIG. 5).

A first recessed portion 81 is disposed between the first protrusion portion 61 and the second protrusion portion 62. The first recessed portion 81 is recessed toward the other side in the tire circumferential direction (the lower side in FIG. 5).

A third protrusion portion 63 and a fourth protrusion portion 64 are provided so as to protrude toward the other side in the tire circumferential direction (the lower side in FIG. 5).

A second recessed portion 82 is disposed between the third protrusion portion 63 and the fourth protrusion portion 64. The second recessed portion 82 is recessed toward the one side in the tire circumferential direction (the upper side in FIG. 5).

In the first modified example, the tip surface 60b includes a seventh protrusion portion 67, an eighth protrusion portion 68, a ninth protrusion portion 69, and a tenth protrusion portion 70 at both end portions in the tire width direction but does not include the fifth protrusion portion 65 and the sixth protrusion portion 66, which differs from the tip surface 60b.

The seventh protrusion portion 67 is provided so as to protrude toward the one side in the tire circumferential direction and toward one side in the tire width direction (the upper left side in FIG. 5).

The eighth protrusion portion 68 is provided so as to protrude toward the one side in the tire circumferential direction and toward the other side in the tire width direction (the upper right side in FIG. 5).

The ninth protrusion portion 69 is provided so as to protrude toward the other side in the tire circumferential direction and toward the one side in the tire width direction (the lower left side in FIG. 5).

The tenth protrusion portion 70 is provided so as to protrude toward the other side in the tire circumferential direction and toward the other side in the tire width direction (the lower right side in FIG. 5).

The tip surface 60b having such a shape that an outer periphery thereof protrudes in all directions at the first to fourth protrusion portions 61 to 64 and the seventh to tenth protrusion portions 67 to 70 enables edge effect to be sufficiently exhibited in any direction, resulting in enhancement in braking performance and turning performance on snow.

In the first modified example, the interior angle of the tip surface 60b at each of the first protrusion portion 61, the second protrusion portion 62, the third protrusion portion 63, the fourth protrusion portion 64, the seventh protrusion portion 67, the eighth protrusion portion 68, the ninth protrusion portion 69, and the tenth protrusion portion 70 is also less than 180°, preferably 30° or greater and 150° or less, and more preferably 60° or greater and 130° or less. The interior angle of the tip surface 60b at each of the first recessed portion 81 and the second recessed portion 82 is greater than 180°, and preferably 300° or less and more preferably 260° or less.

In the embodiment illustrated in FIG. 5, the interior angle of the tip surface 60b at each of the first recessed portion 81 and the second recessed portion 82 is approximately twice (1.8 to 2.2 times) the interior angle of the tip surface 60b at each of the first protrusion portion 61, the second protrusion portion 62, the third protrusion portion 63, the fourth protrusion portion 64, the seventh protrusion portion 67, the eighth protrusion portion 68, the ninth protrusion portion 69, and the tenth protrusion portion 70. Specifically, the interior angle of the tip surface 60b at each of the first protrusion portion 61, the second protrusion portion 62, the third protrusion portion 63, the fourth protrusion portion 64, the seventh protrusion portion 67, the eighth protrusion portion 68, the ninth protrusion portion 69, and the tenth protrusion portion 70 is approximately 120°. The interior angle of the tip surface 60b at each of the first recessed portion 81 and the second recessed portion 82 is approximately 240°.

In the first modified example, the tip surface 60b has line symmetry with respect to a line segment L2 connecting the apex of the first recessed portion 81 with the apex of the second recessed portion 82. The right and left halves with respect to the line segment L2 are hexagonal. Accordingly, upon fitting the stud pin 50A into the stud pin installation hole 40 with the line segment L2 being aligned with the tire width direction, the apex of the first protrusion portion 61 and the apex of the second protrusion portion 62 are in the same position in the tire circumferential direction, the apex of the third protrusion portion 63 and the apex of the fourth protrusion portion 64 are in the same position in the tire circumferential direction, the apex of the fifth protrusion portion 65 and the apex of the sixth protrusion portion 66 are in the same position in the tire circumferential direction, the apex of the seventh protrusion portion 67 and the apex of the eighth protrusion portion 68 are in the same position in the tire circumferential direction, and the apex of the ninth protrusion portion 69 and the apex of the tenth protrusion portion 70 are in the same position in the tire circumferential direction.

Furthermore, the tip surface 60b has line symmetry with respect to a line segment L1 that passes through the midpoint M of the line segment L2 and is perpendicular to the line segment L2. Accordingly, upon fitting the stud pin 50A into the stud pin installation hole 40 with the line segment L1 being aligned with the tire width direction, the apex of the first protrusion portion 61 and the apex of the third protrusion portion 63 are in the same position in the tire width direction, the apex of the second protrusion portion 62 and the apex of the fourth protrusion portion 64 are in the same position in the tire width direction, the apex of the seventh protrusion portion 67 and the apex of the ninth protrusion portion 69 are in the same position in the tire width direction, the apex of the eighth protrusion portion 68 and the apex of the tenth protrusion portion 70 are in the same position in the tire width direction, and the apex of the first recessed portion 81 and the apex of the second recessed portion 82 are in the same position in the tire width direction.

Furthermore, the tip surface 60b has point symmetry with respect to the midpoint M. In the same manner as in the first embodiment, edge effect can thus be sufficiently exhibited in any direction.

In the first modified example, even if chipped small ice accumulates in the first recessed portion 81 between the first protrusion portion 61 and the second protrusion portion 62 protruding toward the one side in the tire circumferential direction, small ice accumulating in the second recessed portion 82 between the third protrusion portion 63 and the fourth protrusion portion 64 protruding toward the other side in the tire circumferential direction can be discharged.

Second Modified Example

Figure 6:
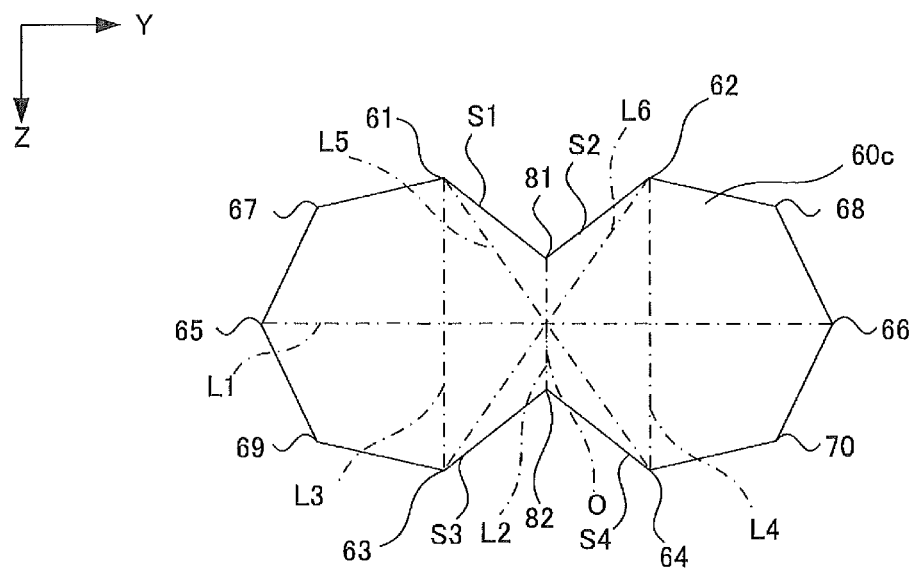
FIG. 6 is a plan view illustrating the shape of a tip surface 60c.

FIG. 6 is a plan view illustrating a tip surface 60c according to a second modified example of the present technology. In the first modified example, the tip surface 60c includes ten protrusion portions 61 to 70 and two recessed portions 81, 82.

In the second modified example, the tip surface 60c also has a shape longer in the tire width direction than in the tire circumferential direction. The stud pin is fitted into the stud pin installation hole 40 of the tire 10 with the lateral direction in FIG. 6 being the tire width direction and the vertical direction in FIG. 6 being the tire circumferential direction.

A first protrusion portion 61 and a second protrusion portion 62 are provided so as to protrude toward one side in the tire circumferential direction (the upper side in FIG. 6).

A first recessed portion 81 is disposed between the first protrusion portion 61 and the second protrusion portion 62.

The first recessed portion 81 is recessed toward the other side in the tire circumferential direction (the lower side in FIG. 6).

A third protrusion portion 63 and a fourth protrusion portion 64 are provided so as to protrude toward the other side in the tire circumferential direction (the lower side in FIG. 6).

A second recessed portion 82 is disposed between the third protrusion portion 63 and the fourth protrusion portion 64. The second recessed portion 82 is recessed toward the one side in the tire circumferential direction (the upper side in FIG. 6).

In the first modified example, the tip surface 60c includes a fifth protrusion portion 65, a sixth protrusion portion 66, a seventh protrusion portion 67, an eighth protrusion portion 68, a ninth protrusion portion 69, and a tenth protrusion portion 70 at both end portions in the tire width direction.

The fifth protrusion portion 65 is provided so as to protrude toward one side in the tire width direction (the left side in FIG. 6).

The sixth protrusion portion 66 is provided so as to protrude toward the other side in the tire width direction (the right side in FIG. 6).

The seventh protrusion portion 67 is provided so as to protrude toward the one side in the tire circumferential direction and toward one side in the tire width direction (the upper left side in FIG. 6).

The eighth protrusion portion 68 is provided so as to protrude toward the one side in the tire circumferential direction and toward the other side in the tire width direction (the upper right side in FIG. 6).

The ninth protrusion portion 69 is provided so as to protrude toward the other side in the tire circumferential direction and toward the one side in the tire width direction (the lower left side in FIG. 6).

The tenth protrusion portion 70 is provided so as to protrude toward the other side in the tire circumferential direction and toward the other side in the tire width direction (the lower right side in FIG. 6).

The tip surface 60c having such a shape that the outer periphery thereof protrudes in all directions at the first to tenth protrusion portions 61 to 70 enables edge effect to be sufficiently exhibited in any direction, resulting in enhancement in braking performance and turning performance on snow.

In the second modified example, the interior angle of the tip surface 60c at each of the first protrusion portion 61, the second protrusion portion 62, the third protrusion portion 63, the fourth protrusion portion 64, the fifth protrusion portion 65, the sixth protrusion portion 66, the seventh protrusion portion 67, the eighth protrusion portion 68, the ninth protrusion portion 69, and the tenth protrusion portion 70 is also less than 180°, preferably 30° or greater and 150° or less, and more preferably 60° or greater and 130° or less. The interior angle of the tip surface 60c at each of the first recessed portion 81 and the second recessed portion 82 is greater than 180°, and preferably 300° or less and more preferably 260° or less.

In the embodiment illustrated in FIG. 6, the interior angle of the tip surface 60c at each of the first recessed portion 81 and the second recessed portion 82 is approximately twice (1.8 to 2.2 times) the interior angle of the tip surface 60c at each of the first protrusion portion 61, the second protrusion portion 62, the third protrusion portion 63, the fourth protrusion portion 64, the fifth protrusion portion 65, the sixth protrusion portion 66, the seventh protrusion portion 67, the eighth protrusion portion 68, the ninth protrusion portion 69, and the tenth protrusion portion 70.

Specifically, the interior angle of the tip surface 60c at each of the first protrusion portion 61, the second protrusion portion 62, the third protrusion portion 63, the fourth protrusion portion 64, the fifth protrusion portion 65, the sixth protrusion portion 66, the seventh protrusion portion 67, the eighth protrusion portion 68, the ninth protrusion portion 69, and the tenth protrusion portion 70 is approximately 129°. The interior angle of the tip surface 60c at each of the first recessed portion 81 and the second recessed portion 82 is approximately 257°.

In the second modified example, the tip surface 60c has line symmetry with respect to a line segment L1 connecting the apex of the fifth protrusion portion 65 with the apex of the sixth protrusion portion 66. Accordingly, upon fitting the stud pin 50A into the stud pin installation hole 40 with the line segment L1 being aligned with the tire width direction, the apex of the first protrusion portion 61 and the apex of the third protrusion portion 63 are in the same position in the tire width direction, the apex of the second protrusion portion 62 and the apex of the fourth protrusion portion 64 are in the same position in the tire width direction, and the apex of the first recessed portion 81 and the apex of the second recessed portion 82 are in the same position in the tire width direction.

At this time, a line segment L2 connecting the apex of the first recessed portion 81 with the apex of the second recessed portion 82, a line segment L3 connecting the apex of the first protrusion portion 61 with the apex of the third protrusion portion 63, and a line segment L4 connecting the apex of the second protrusion portion 62 with the apex of the fourth protrusion portion 64 are orthogonal to the line segment L1.

In the second modified example, the tip surface 60c has line symmetry with respect to the line segment L2. The right and left halves with respect to the line segment L2 are heptangular. Accordingly, upon fitting the stud pin 50A into the stud pin installation hole 40 with the line segment L2 being aligned with the tire width direction, the apex of the first protrusion portion 61 and the apex of the second protrusion portion 62 are in the same position in the tire circumferential direction, the apex of the third protrusion portion 63 and the apex of the fourth protrusion portion 64 are in the same position in the tire circumferential direction, the apex of the seventh protrusion portion 67 and the apex of the eighth protrusion portion 68 are in the same position in the tire circumferential direction, and the apex of the ninth protrusion portion 69 and the apex of the tenth protrusion portion 70 are in the same position in the tire circumferential direction.

In the second modified example, the tip surface 60c also has point symmetric with respect to the point of intersection O of the line segment L1 and the line segment L2. In the same manner as in the first embodiment, edge effect can thus be sufficiently exhibited in any direction.

In the second modified example, even if chipped small ice accumulates in the first recessed portion 81 between the first protrusion portion 61 and the second protrusion portion 62 protruding toward the one side in the tire circumferential direction, small ice accumulating in the second recessed portion 82 between the third protrusion portion 63 and the fourth protrusion portion 64 protruding toward the other side in the tire circumferential direction can be discharged.

Third Modified Example

Figure 7:
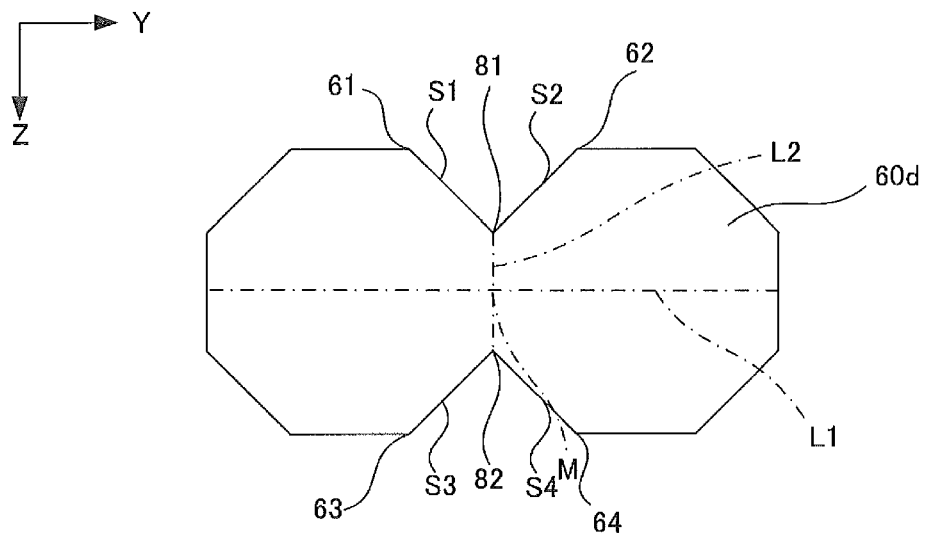
FIG. 7 is a plan view illustrating the shape of a tip surface 60d.

FIG. 7 is a plan view illustrating a tip surface 60d according to a third modified example of the present technology. As illustrated in FIG. 7, the tip surface 60d includes two recessed portions 81, 82 and twelve protrusion portions including a first protrusion portion 61, a second protrusion portion 62, a third protrusion portion 63, and a fourth protrusion portion 64. The tip surface 60d has line symmetry with respect to a line segment L2 connecting the apex of a first recessed portion 81 with the apex of a second recessed portion 82. The right and left halves with respect to the line segment L2 are octagonal. The interior angle of the tip surface 60d at each of the twelve protrusion portions is approximately 135°. The interior angle of the tip surface 60d at each of the first recessed portion 81 and the second recessed portion 82 is approximately 270°.

The tip surface 60d has line symmetry with respect to a line segment L1 that passes through the midpoint M pf the line segment L2 and is perpendicular to the line segment L2.

Furthermore, the tip surface 60d has point symmetry with respect to the midpoint M. In the same manner as in the first embodiment, edge effect can thus be sufficiently exhibited in any direction.

In the third modified example, even if chipped small ice accumulates in the first recessed portion 81 between the first protrusion portion 61 and the second protrusion portion 62 protruding toward one side in the tire circumferential direction, small ice accumulating in the second recessed portion 82 between the third protrusion portion 63 and the fourth protrusion portion 64 protruding toward the other side in the tire circumferential direction can be discharged.

Second Embodiment

Figure 8:
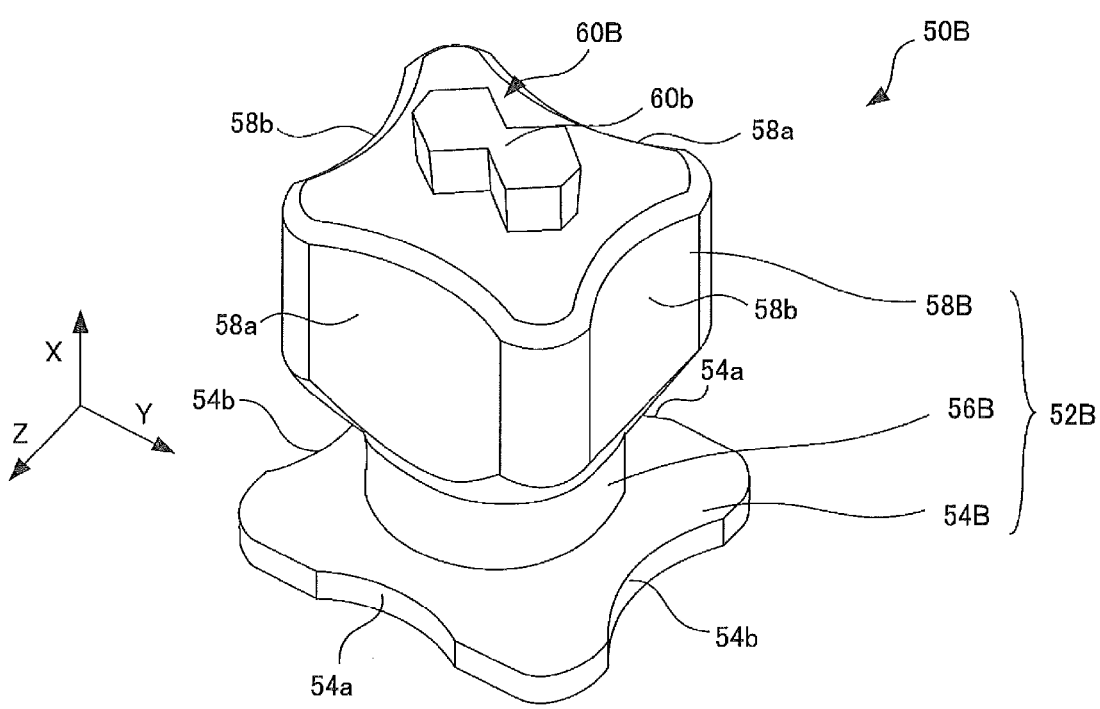
FIG. 8 is an external perspective view illustrating a stud pin 50B of a second embodiment of the present technology.

FIG. 8 is a perspective view illustrating a stud pin 50B according to a second embodiment of the present technology. The stud pin 50B in the second embodiment includes a tip portion 60B having a tip surface 60b in the shape illustrated in FIG. 5. A buried base portion 52B in the second embodiment is shaped differently from the buried base portion 52A in the first embodiment.

The buried base portion 52B of the stud pin 50B illustrated in FIG. 8 includes a bottom portion 54B, a shank portion 56B, and a body portion 58B that are formed in this order in the X direction.

The bottom portion 54B is provided, on the outer peripheral surface coming into contact with the side surface of the stud pin installation hole 40, with recessed portions 54a on both sides in the tire circumferential direction and recessed portions 54b on both sides in the tire width direction. Specifically, the cross section of the bottom portion 54B is a substantially quadrangular shape with rounded corners. The four sides of the substantially quadrangular shape are recessed to form four of the recessed portions 54a, 54b. In the present embodiment, one pair of sides among the four sides of the substantially quadrangular shape of the bottom portion 54B faces the tire width direction, and the other pair of sides faces the tire circumferential direction. The sides in the tire width direction, provided with the recessed portions 54a are longer than the sides in the tire circumferential direction, provided with the recessed portions 54b. In other words, the cross section of the bottom portion 54B perpendicular to the X direction has a substantially rectangular shape including a longitudinal direction in the tire width direction. The substantially quadrangular bottom portion 54B prevents or minimizes rotational motion of the stud pin 50B about the central axis thereof aligned with the X direction. Note that the rounded corners of the bottom portion 54B can prevent damage to the side surface of the stud pin installation hole 40. Forming the recessed portions 54a, 54b can increase the surface area per unit volume of the bottom portion 54B and can thus increase the surface contact area with the tread rubber member 18 of the tread portion and the friction force restricting movement of the stud pin 50B. The tread rubber member 18 filling the recessed portions 54a, 54b also prevents or minimizes rotational motion of the stud pin 50B about a central axis thereof aligned with the X direction. In addition, the recessed portions 54a, 54b ensure that the first recessed portion 71 and the second recessed portion 82 of the tip portion 60B face the tire circumferential direction.

The shank portion 56B connects the body portion 58B to the bottom portion 54B. The shank portion 56B has a cylindrical shape with a diameter less than the maximum outer diameter of the bottom portion 54B and that of the body portion 58B. The shank portion 56B is thus formed as a recessed portion relative to the body portion 58B and the bottom portion 54B, and the bottom portion 54B and the body portion 58B are formed in a flange-like shape. Recessed portions are not formed in the outer peripheral surface of the shank portion 56B.

The body portion 58B is located between the shank portion 56B and the tip portion 60B and is the flange-like portion connected to the tip portion 60B. The body portion 58B is provided, on the outer peripheral surface pressed by the side surface of the stud pin installation hole, with recessed portions 58a on both sides in the tire circumferential direction and recessed portions 58b on both sides in the tire width direction. This outer peripheral surface is brought into contact with and pressed by the tread rubber material 18 of the tread portion, and the friction force thus generated restricts movement of the stud pin 50B.

The body portion 58B has a cross section perpendicular to the X direction that is a substantially quadrangular shape having rounded corners with four of the recessed portions 58a, 58b formed by the four sides being recessed. The substantially quadrangular body portion 58B prevents or minimizes rotational motion of the stud pin 50B about the central axis thereof aligned with the X direction. Note that the rounded corners of the body portion 58B of the stud pin 50B can prevent damage to the side surface of the stud pin installation hole.

Forming the recessed portions 58a, 58b can increase the surface area per unit volume of the body portion 58B and can thus increase the surface contact area with the tread rubber member 18 of the tread portion and the friction force restricting movement of the stud pin 50B. The tread rubber member 18 filling the recessed portions 58a, 58b also prevents or minimizes rotational motion of the stud pin 50B about the central axis thereof aligned with the X direction. In addition, the recessed portions 58a, 58 ensure that the first recessed portion 81 and the second recessed portion 82 of the tip portion 60B face the tire circumferential direction.

The body portion 58B is embedded in the tread rubber member 18, with an upper end surface of the body portion 58B being exposed, flush with the tread surface when the stud pin 50B is fitted into the tire 10.

The stud pin 50B according to the second embodiment can achieve a similar result to that of the stud pin 50A according to the first embodiment and can prevent or minimize rotational motion of the buried base portion 52B about the central axis thereof aligned with the X direction. Accordingly, the stud pin 50B ensures that the first recessed portion 81 and the second recessed portion 82 of the tip portion 60B face the tire circumferential direction.

In the present embodiment, the tip portion 60B has the same shape as the tip surface 60b illustrated in FIG. 5.

However, the present technology is not limited to this configuration. For example, the tip portion may have a tip surface in the same shape as the tip surface 60a illustrated in FIG. 4 or the tip surface 60c illustrated in FIG. 6.

Third Embodiment

Figure 9:
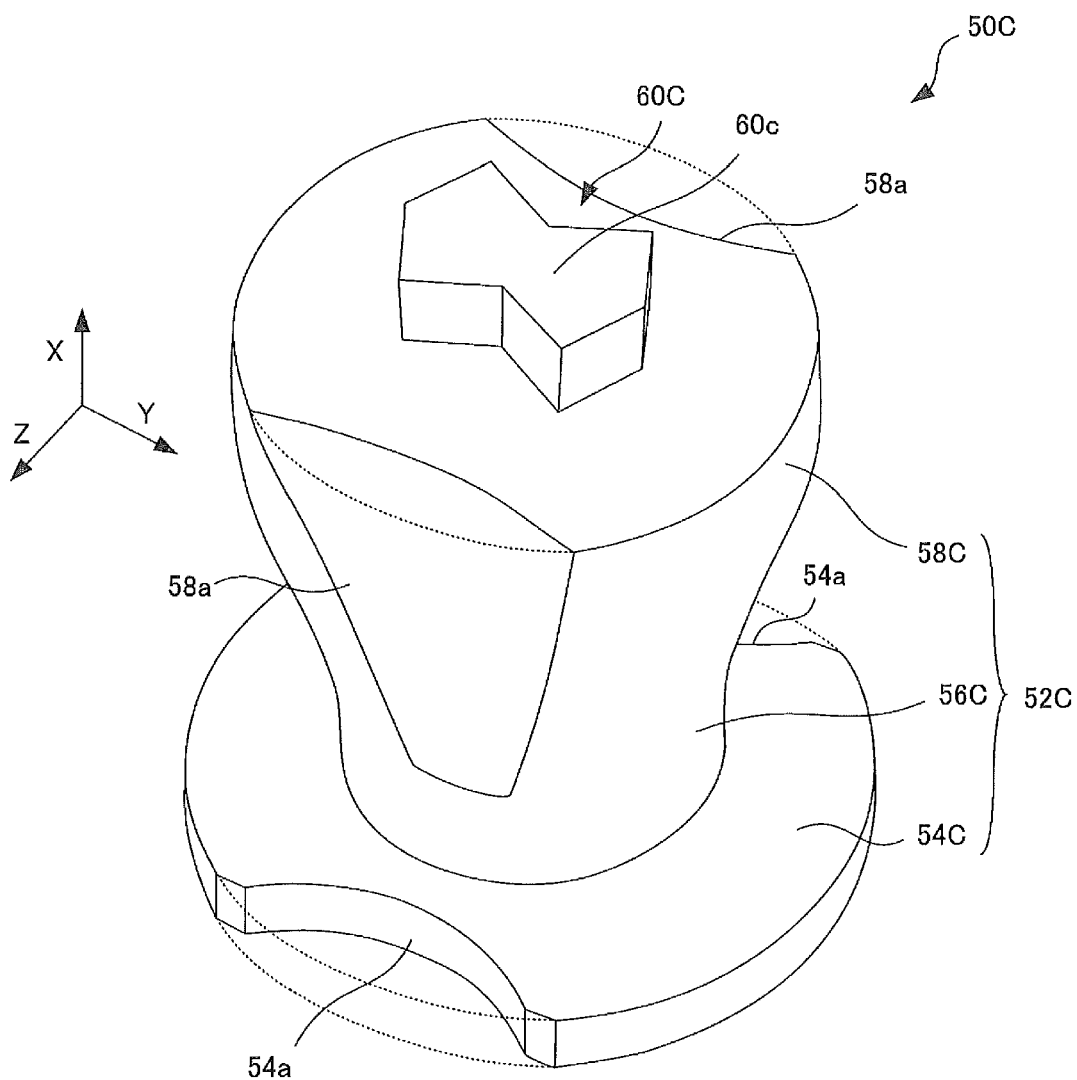
FIG. 9 is an external perspective view illustrating a stud pin 50C of a third embodiment of the present technology.

FIG. 9 is a perspective view illustrating a stud pin 50C according to a third embodiment of the present technology. The stud pin 50C in the third embodiment includes a tip portion 60C having the tip surface 60a in the shape illustrated in FIG. 4. A buried base portion 52C in the third embodiment is shaped differently from the buried base portion 52A in the first embodiment and the buried base portion 52B in the second embodiment.

The buried base portion 52C of the stud pin 50C illustrated in FIG. 9 includes a bottom portion 54C, a shank portion 56C, and a body portion 58C that are formed in this order in the X direction.

The bottom portion 54C is provided, on the outer peripheral surface coming into contact with the side surface of the stud pin installation hole 40, with recessed portions 54a on both sides in the tire circumferential direction. Specifically, the bottom portion 54C has a substantially disk shape with the two recessed portions 54a formed on both sides in the tire circumferential direction. The two recessed portions 54a of the bottom portion 54C prevent or minimize rotational motion of the stud pin 50C about a central axis thereof aligned with the X direction. Forming the recessed portions 54a can increase the surface area per unit volume of the bottom portion 54C and can thus increase the surface contact area with the tread rubber member 18 of the tread portion and the friction force restricting movement of the stud pin 50C. The tread rubber member 18 filling the recessed portions 54a also prevents or minimizes rotational motion of the stud pin 50C about the central axis thereof aligned with the X direction. In addition, the recessed portions 54a ensure that a first recessed portion 81 and a second recessed portion 82 of the tip portion 60C face the tire circumferential direction.

The shank portion 56C connects the body portion 58C to the bottom portion 54C. The shank portion 56C is cylindrical with a diameter less than the maximum outer diameter of the bottom portion 54C and that of the body portion 58C. The shank portion 56C is thus formed as a recessed portion relative to the body portion 58C and the bottom portion 54C, and the bottom portion 54C and the body portion 58C are formed in a flange-like shape. Recessed portions are not formed in the outer peripheral surface of the shank portion 56C.

The body portion 58C is located between the shank portion 56C and the tip portion 60C and expands gradually from the shank portion 56C toward the tip portion 60C. The body portion 58C is provided, on the outer peripheral surface pressed by the side surface of the stud pin installation hole, with recessed portions 58a on both sides in the tire circumferential direction. This outer peripheral surface is brought into contact with and pressed by the tread rubber material 18 of the tread portion, and the friction force thus generated restricts movement of the stud pin 50C.

The body portion 58C has a cross section perpendicular to the X direction that has a circular shape with two notches. The two notches correspond to the positions of the recessed portions 58a on both sides in the tire circumferential direction. The recessed portions 58a of the body portion 58C prevent or minimize rotational motion of the stud pin 50C about the central axis thereof aligned with X direction. Note that the body portion 58C, without corners except the recessed portions 58a, of the stud pin 50C can prevent damage to the side surface of the stud pin installation hole.

Forming the recessed portions 58a can increase the surface area per unit volume of the body portion 58C and can thus increase the surface contact area with the tread rubber member 18 of the tread portion and the friction force restricting movement of the stud pin 50C. The tread rubber member 18 filling the recessed portions 58a also prevents or minimizes rotational motion of the stud pin 50C about the central axis thereof aligned with the X direction. In addition, the recessed portions 58a ensure that the first recessed portion 81 and the second recessed portion 82 of the tip portion 60C face the tire circumferential direction.

The body portion 58C is embedded in the tread rubber member 18, with an upper end surface of the body portion 58C being exposed, flush with the tread surface when the stud pin 50C is fitted into the tire 10.

The stud pin 50C according to the third embodiment can achieve a similar result to that of the stud pin 50A according to the first embodiment and that of the stud pin 50B according to the second embodiment and can prevent or minimize rotational motion of the buried base portion 52C about the central axis thereof aligned with the X direction. Accordingly, the stud pin 50C ensures that the first recessed portion 81 and the second recessed portion 82 of the tip portion 60C face the tire circumferential direction.

In the present embodiment, the tip portion 60C has the same shape as the tip surface 60a illustrated in FIG. 4. However, the present technology is not limited to this configuration. For example, the tip portion may have a tip surface in the same shape as the tip surface 60b illustrated in FIG. 5 or the tip surface 60c illustrated in FIG. 6.

Fourth Embodiment

Figure 10:
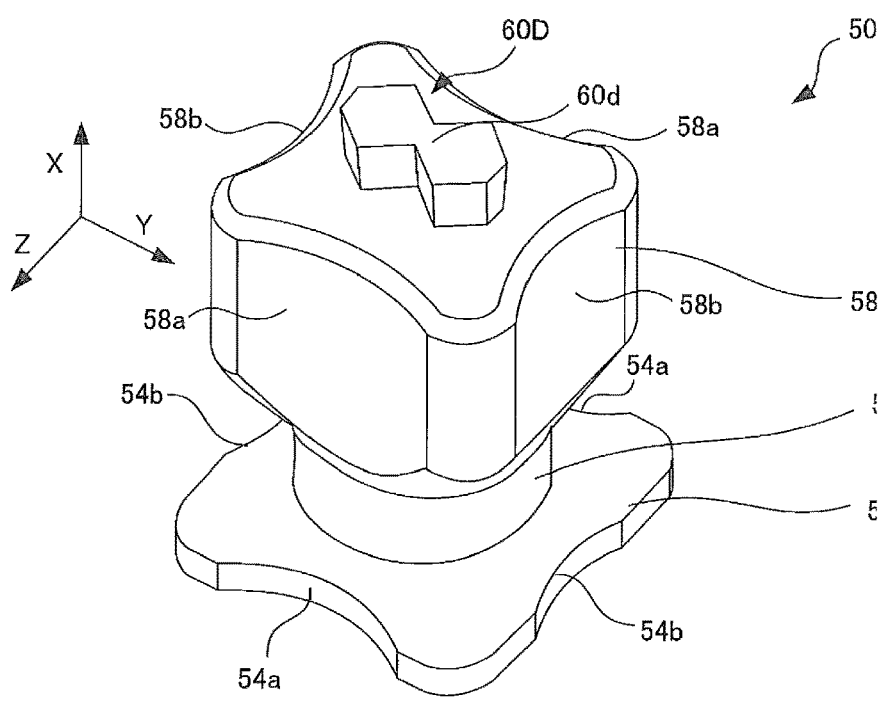
FIG. 10 is an external perspective view illustrating a stud pin 50D of a fourth embodiment of the present technology.

FIG. 10 is a perspective view illustrating a stud pin 50D according to a fourth embodiment of the present technology. The stud pin 50D in the fourth embodiment includes a bottom portion 54D shaped differently from the bottom portion 54B of the stud pin 50B illustrated in FIG. 8.

In the present embodiment, one pair of sides among the four sides of the substantially quadrangular shape of the bottom portion 54D faces the tire width direction, and the other pair of sides faces the tire circumferential direction. The sides in the tire width direction, provided with the recessed portions 54a are shorter than the sides in the tire circumferential direction, provided with the recessed portions 54b. In other words, the cross section of the bottom portion 54D perpendicular to the X direction has a substantially rectangular shape including a longitudinal direction in the tire circumferential direction.

In the present embodiment, which has the tip surface 60b illustrated in FIG. 5 in the same manner as the tip portion 60B in the second embodiment, even if chipped small ice accumulates in the first recessed portion 81 between the first protrusion portion 61 and the second protrusion portion 62 protruding toward the one side in the tire circumferential direction, small ice accumulating in the second recessed portion 82 between the third protrusion portion 63 and the fourth protrusion portion 64 protruding toward the other side in the tire circumferential direction can be discharged. This configuration can also prevent or minimize rotational motion of the buried base portion 52D about a central axis thereof aligned with the X direction.

Fifth Embodiment

Figure 11:
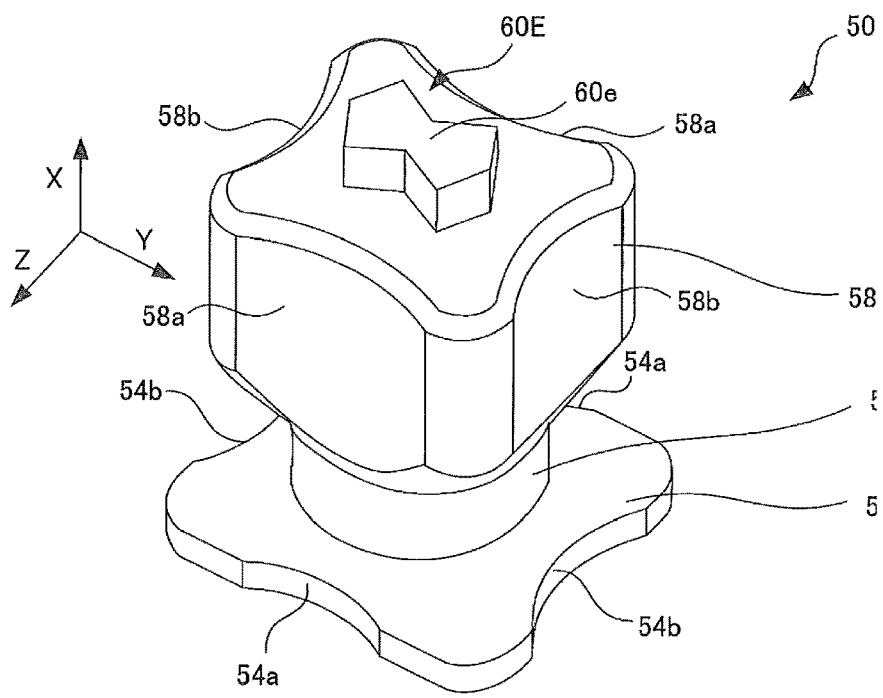
FIG. 11 is an external perspective view illustrating a stud pin 50E of a fifth embodiment of the present technology.

FIG. 11 is a perspective view illustrating a stud pin 50E according to a fifth embodiment of the present technology.

The stud pin 50E in the fifth embodiment includes a buried base portion 52E in the same shape as the buried base portion 52B illustrated in FIG. 8 and a tip portion 60E in the same shape as the tip portion 60C illustrated in FIG. 9.

In the present embodiment, which has the tip surface 60a illustrated in FIG. 4 in the same manner as the tip portion 60C in the fifth embodiment, even if chipped small ice accumulates in the first recessed portion 81 between the first protrusion portion 61 and the second protrusion portion 62 protruding toward the one side in the tire circumferential direction, small ice accumulating in the second recessed portion 82 between the third protrusion portion 63 and the fourth protrusion portion 64 protruding toward the other side in the tire circumferential direction can be discharged. This configuration can also prevent or minimize rotational motion of the buried base portion 52E about a central axis thereof aligned with the X direction.

Examples

To test the effects of the stud pins of the embodiments, the same stud pins as the stud pin 60A illustrated in FIG. 2 were fitted into the same tires as the tire 10 illustrated in FIG. 1. The size of the tires was 205/55R16.

The tip portion in Conventional Example had a circular tip surface.

The tip portion in Comparative Example 1 had a square tip surface. The stud pin was fitted into the tire with one pair of opposite corners among the four corners of the square facing the tire circumferential direction and the other pair of corners facing the tire width direction.

Figure 12:
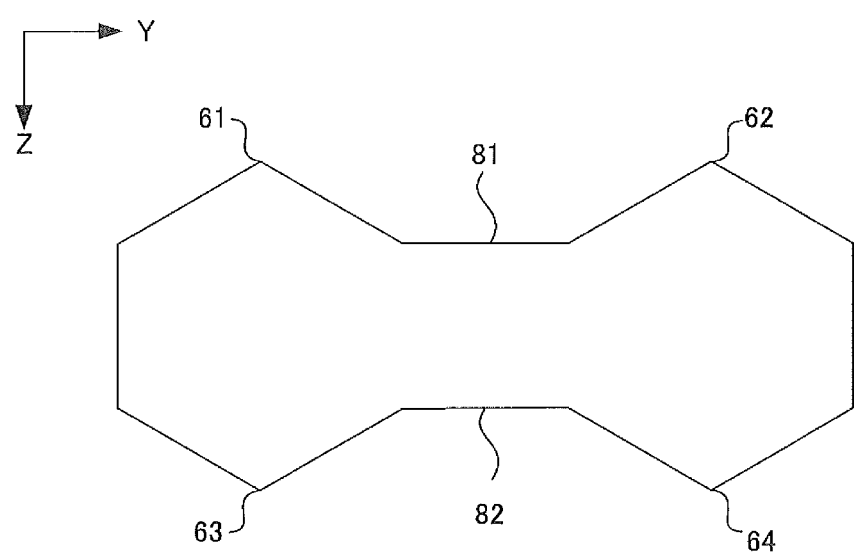
FIG. 12 is a plan view illustrating the shape of a tip surface of Comparative Example 2.

The tip portion in Comparative Example 2 had a tip surface in the same shape as that illustrated in FIG. 12. The tip surface illustrated in FIG. 12 has the same shape as that illustrated in FIG. 5 but has sides parallel to the tire width direction at the recessed portions 81, 82.

The tip portion in Example 1 had a tip surface in the same shape as the tip surface 60a illustrated in FIG. 4.

The tip portion in Example 2 had a tip surface in the same shape as the tip surface 60b illustrated in FIG. 5.

The tip portion in Example 3 had a tip surface in the same shape as the tip surface 60c illustrated in FIG. 6.

The tip portion in Example 4 had a tip surface in the same shape as the tip surface 60d illustrated in FIG. 7.

The tip portions in Examples 5 to 11 each had a tip surface in the same shape as the tip surface 60b illustrated in FIG. 5. The interior angle of the tip surface at each of the first to fourth protrusion portions 61 to 64 was the same, and the ratio Lmin/Lmax was different in each of Examples 5 to 11.

The tip portions in Examples 12 to 19 each had a tip surface in the same shape as the tip surface 60b illustrated in FIG. 5. The ratio Lmin/Lmax was the same, and the interior angle of the tip surface at each of the first to fourth protrusion portions 61 to 64 was different in each of Examples 12 to 19.

"Number of protrusion portions on one side in the circumferential direction" in Tables 1 to 3 indicates the number of protrusion portions on one side relative to the straight line passing through the center of the tip portion and aligned with the tire width direction, that is, the number of protrusion portions on one side relative to the line segments L1 in FIGS. 4 to 7.

The tires for Examples and Conventional Example were fitted to a passenger vehicle, and braking performance on ice was evaluated.

Braking Performance on Ice

The passenger vehicle used was a front-wheel drive sedan with an engine displacement of 2000 cc. The internal pressure condition of the tires was 230 (kPa) for both the front wheels and rear wheels. The load condition of the tires was a 450 kg load on each front wheel and a 300 kg load on each rear wheel.

This passenger vehicle ran on a test course having an icy road surface, and sensory evaluation by a driver was conducted of steering wheel responsiveness, grip characteristics, and the like. The evaluation was indexed with the evaluation of Conventional Example expressed as 100. A greater index indicates better performance.

The results are shown in Tables 1 to 3.

TABLE 1

|  | Conventional Example | Comparative Example 1 | Comparative Example 2 | Example 1 | Example 2 | Example 3 | Example 4 |
|---|---|---|---|---|---|---|---|
| Total number of protrusion portions | 0 | 4 | 8 | 6 | 8 | 10 | 12 |
| Number of protrusion portions on one side in the circumferential direction | 0 | 1 | 4 | 2 | 4 | 4 | 6 |
| Lmin/Lmax | — | — | 0.50 | 0.62 | 0.50 | 0.45 | 0.41 |
| Angle (°) at protrusion portions | — | 90 | 120 | 108 | 120 | 128.6 | 135 |
| Braking on ice | 100 | 102 | 104 | 114 | 116 | 114 | 107 |

TABLE 2

|  | Example 5 | Example 6 | Example 7 | Example 8 | Example 9 | Example 10 | Example 11 |
|---|---|---|---|---|---|---|---|
| Total number of protrusion portions | 8 | 8 | 8 | 8 | 8 | 8 | 8 |
| Number of protrusion portions on one side | 4 | 4 | 4 | 4 | 4 | 4 | 4 |

TABLE 2-continued

|  | Example 5 | Example 6 | Example 7 | Example 8 | Example 9 | Example 10 | Example 11 |
|---|---|---|---|---|---|---|---|
| in the circumferential direction |  |  |  |  |  |  |  |
| Lmin/Lmax | 0.20 | 0.30 | 0.40 | 0.5 | 0.60 | 0.70 | 0.80 |
| Angle (°) at protrusion portions | 120 | 120 | 120 | 120 | 120 | 120 | 120 |
| Braking on ice | 110 | 113 | 115 | 116 | 115 | 113 | 110 |

TABLE 3

|  | Example 12 | Example 13 | Example 14 | Example 15 | Example 16 | Example 17 | Example 18 | Example 19 |
|---|---|---|---|---|---|---|---|---|
| Total number of protrusion portions | 8 | 8 | 8 | 8 | 8 | 8 | 8 | 8 |
| Number of protrusion portions on one side in the circumferential direction | 4 | 4 | 4 | 4 | 4 | 4 | 4 | 4 |
| Lmin/Lmax | 0.50 | 0.50 | 0.50 | 0.50 | 0.50 | 0.50 | 0.50 | 0.50 |
| Angle (°) at protrusion portions | 20 | 30 | 50 | 60 | 130 | 140 | 150 | 160 |
| Braking on ice | 107 | 110 | 113 | 115 | 115 | 113 | 110 | 107 |

On comparison between Conventional Example, Comparative Example 1, and Example 1 in Table 1, it is understood that the recessed portions provided on both sides of the tip portion in the tire circumferential direction enhance braking performance on ice. On comparison between Comparative Example 2 and Example 8, it is understood that Example 8 having the recessed portions each formed by two sides inclining in opposite directions relative to the tire width direction exhibits better braking performance on ice than Comparative Example 2 having the sides parallel to the tire width direction at the recessed portions.

On comparison between Examples 1 to 4, it is understood that six to eight protrusion portions further enhance braking performance on ice.

On comparison between Examples 5 to 11 in Table 2, it is understood that a ratio Lmin/Lmax of 0.3 or greater and 0.7 or less further enhances braking performance on ice.

On comparison between Examples 12 to 19 in Table 3, it is understood that an interior angle, of 30° or greater and 150° or less, of the tip surface at each of the first to fourth protrusion portions enhances braking performance on ice and an interior angle of 60° or greater and 130° or less further enhances braking performance on ice.

The foregoing has been a detailed description of the stud pin and pneumatic tire of the present technology. However, the pneumatic tire of the present technology is not limited to the above embodiments, and may be enhanced or modified in various ways within the scope of the present technology.

The invention claimed is:

1. A pneumatic tire comprising:
   stud pins fitted into stud pin installation holes of a tread portion of the pneumatic tire;
   the stud pins each comprising:
      a buried base portion being embedded in the tread portion of the pneumatic tire and extending in a tire radial direction; and
      a tip portion protruding from a road contact surface of the tread portion upon embedding of the buried base portion into the tread portion;
   the tip portion having a tip surface longer in a tire width direction than in a tire circumferential direction;
   the tip surface having a contour formed by:
      a first protrusion portion and a second protrusion portion protruding toward a first side in the tire circumferential direction;
      a first recessed portion disposed between the first protrusion portion and the second protrusion portion and recessed toward a second side opposite the first side in the tire circumferential direction;
      a third protrusion portion and a fourth protrusion portion protruding toward the second side in the tire circumferential direction; and
      a second recessed portion disposed between the third protrusion portion and the fourth protrusion portion and recessed toward the first side in the tire circumferential direction;
   the first recessed portion and the second recessed portion being all of recess portions by which the contour is formed, and each being formed by a pair of adjacent sides of the tip surface, the pair of adjacent sides including a side A and a side B;
   the side A inclining relative to the tire width direction at an angle greater than 0 degrees and less than 90 degrees, and the side B inclining in an opposite direction to the inclining direction of the side A relative to the tire width direction at an angle greater than 0 degrees and less than 90 degrees;
   the tip surface comprising six to ten protrusion portions protruding outward, inclusive the first to fourth protrusion portions;
   each of the first recessed portion and the second recessed portion being an intersection point of the pair of adjacent sides, in which both of the adjacent sides forming the intersection point of the first recessed portion being directed toward the second side when approaching the intersection point of the first recessed portion, and both of the adjacent sides forming the intersection point of the second recessed portion being directed toward the first side when approaching the intersection point of the second recessed portion;

the first recessed portion and the second recessed portion lying on a same lateral position in the tire width direction; and a length on the tip surface of the tip portion in the tire circumferential direction decreasing to reach a minimum length at the lateral position of the first recessed portion and the second recessed portion, when approaching to the lateral position from both sides of the tire width direction within a region between the first protrusion portion and the second protrusion portion or a region between the third protrusion portion and the fourth protrusion portion.

2. The pneumatic tire according to claim 1, wherein
the first protrusion portion being connected with the first recessed portion by the side A forming the first recessed portion, and the second protrusion portion being connected with the first recessed portion by the side B forming the first recessed portion, and the third protrusion portion being connected with the second recessed portion by the side A forming the second recessed portion, and the fourth protrusion portion being connected with the second recessed portion by the side B forming the second recessed portion.

3. The pneumatic tire according to claim 1, wherein a ratio Lmin/Lmax of a distance Lmin from the first recessed portion to the second recessed portion to a maximum length Lmax of the tip surface in the tire circumferential direction is 0.3 or greater and 0.7 or less.

4. The pneumatic tire according to claim 1, wherein the protrusion portions each comprises a corner having an angle of 30° or greater and 150° or less.

5. The pneumatic tire according to claim 1, wherein
the buried base portion comprises:
   a body portion to which the tip portion is anchored;
   a bottom portion located on an end portion opposite the body portion; and
   a shank portion connecting the body portion to the bottom portion; and
the body portion comprises:
   a recessed portion recessed from a side surface on the first side of the body portion in a direction identical to a recess direction of the first recessed portion; and
   a recessed portion recessed from a side surface on the second side of the body portion in a direction identical to a recess direction of the second recessed portion.

6. The pneumatic tire according to claim 1, wherein
the buried base portion comprises:
   a body portion to which the tip portion is anchored;
   a bottom portion located on an end portion opposite the body portion; and
   a shank portion connecting the body portion to the bottom portion; and
the bottom portion comprises:
   a third recessed portion recessed from a side surface of the bottom portion on the first side in the tire circumferential direction toward the second side; and
   a fourth recessed portion recessed from a side surface on the second side in the tire circumferential direction toward the first side.

7. The pneumatic tire according to claim 1, wherein
the buried base portion comprises:
   a body portion to which the tip portion is anchored;
   a bottom portion located on an end portion opposite the body portion; and
   a shank portion connecting the body portion to the bottom portion; and
the body portion comprises:
   a fifth recessed portion recessed from a side surface of the body portion on the first side in the tire circumferential direction toward the second side; and
   a sixth recessed portion recessed from a side surface on the second side in the tire circumferential direction toward the first side.

8. The pneumatic tire according to claim 1, wherein
the buried base portion comprises:
   a body portion to which the tip portion is anchored;
   a bottom portion located on an end portion opposite the body portion; and
   a shank portion connecting the body portion to the bottom portion; and
the bottom portion has a cross section perpendicular to an extending direction of the buried base portion, the cross section having a substantially rectangular shape including a longitudinal direction in the tire circumferential direction.

9. The pneumatic tire according to claim 1, wherein
the buried base portion comprises:
   a body portion to which the tip portion is anchored;
   a bottom portion located on an end portion opposite the body portion; and
   a shank portion connecting the body portion to the bottom portion; and
the bottom portion has a cross section perpendicular to an extending direction of the buried base portion, the cross section having a substantially rectangular shape including a longitudinal direction in the tire width direction.

10. A pneumatic tire comprising:
stud pins fitted into stud pin installation holes of a tread portion of the pneumatic tire;
the stud pins each comprising:
   a buried base portion being embedded in the tread portion of the pneumatic tire and extending in a tire radial direction; and
   a tip portion protruding from a road contact surface of the tread portion upon embedding of the buried base portion into the tread portion;
the tip portion having a tip surface longer in a tire width direction than in a tire circumferential direction;
the tip surface having a contour formed by:
   a first protrusion portion and a second protrusion portion protruding toward a first side in the tire circumferential direction;
   a first recessed portion disposed between the first protrusion portion and the second protrusion portion and recessed toward a second side opposite the first side in the tire circumferential direction;
   a third protrusion portion and a fourth protrusion portion protruding toward the second side in the tire circumferential direction; and
   a second recessed portion disposed between the third protrusion portion and the fourth protrusion portion and recessed toward the first side in the tire circumferential direction;

the first recessed portion and the second recessed portion being all of recess portions by which the contour is formed, and each being formed by a pair of adjacent sides of the tip surface, the pair of adjacent sides including a side A and a side B;

the side A inclining relative to the tire width direction at an angle greater than 0 degrees and less than 90 degrees, and the side B inclining in an opposite direction to the inclining direction of the side A relative to the tire width direction at an angle greater than 0 degrees and less than 90 degrees;

the tip surface comprising six to ten protrusion portions protruding outward, inclusive the first to fourth protrusion portions;

each of the first recessed portion and the second recessed portion being an intersection point of the pair of adjacent sides, in which both of the adjacent sides forming the intersection point of the first recessed portion being directed toward the second side when approaching the intersection point of the first recessed portion, and both of the adjacent sides forming the intersection point of the second recessed portion being directed toward the first side when approaching the intersection point of the second recessed portion;

the first recessed portion and the second recessed portion lying on a same lateral position in the tire width direction; and a length on the tip surface of the tip portion in the tire circumferential direction decreasing to reach a minimum length at the lateral position of the first recessed portion and the second recessed portion, when approaching to the lateral position from both sides of the tire width direction within a region between the first protrusion portion and the second protrusion portion or a region between the third protrusion portion and the fourth protrusion portion;

wherein the contour is formed by an outmost protrusion portion protruding outmost on one side of the tire width direction, the outmost protrusion portion being a corner that is located in a region in the tire circumferential direction between the first recessed portion and the second recessed portion, excluding both positions of the first recessed portion and the second recessed portion.

11. The pneumatic tire according to claim 10, wherein the outmost protrusion portion is located on a middle point between the first recessed portion and the second recessed portion in the tire circumferential direction.

* * * * *